(12) United States Patent
Kimura

(10) Patent No.: US 10,493,929 B2
(45) Date of Patent: Dec. 3, 2019

(54) CABLE GUIDE ATTACHMENT STRUCTURE

(71) Applicant: Sumitomo Wiring Systems, Ltd., Yokkaichi, Mie (JP)

(72) Inventor: Yu Kimura, Mie (JP)

(73) Assignee: SUMITOMO WIRING SYSTEMS, LTD., Yokkaichi, Mie (JP)

( * ) Notice: Subject to any disclaimer, the term of this patent is extended or adjusted under 35 U.S.C. 154(b) by 114 days.

(21) Appl. No.: 15/218,656

(22) Filed: Jul. 25, 2016

(65) Prior Publication Data

US 2017/0028944 A1 Feb. 2, 2017

(30) Foreign Application Priority Data

Jul. 29, 2015 (JP) ................................ 2015-149382

(51) Int. Cl.
 B60R 16/027 (2006.01)
(52) U.S. Cl.
 CPC ................. B60R 16/027 (2013.01)
(58) Field of Classification Search
 CPC ............ B60R 16/027; B60R 16/0215; B60R 16/0207; H02G 11/00
 USPC ............................ 248/65; 49/360; 296/155
 See application file for complete search history.

(56) References Cited

U.S. PATENT DOCUMENTS

| 9,150,168 | B2 * | 10/2015 | Inoue | H02G 11/006 |
| 2012/0267140 | A1 * | 10/2012 | Soh | H05K 7/026 |
| | | | | 174/61 |
| 2014/0238740 | A1 * | 8/2014 | Inoue | H02G 11/006 |
| | | | | 174/72 A |

FOREIGN PATENT DOCUMENTS

JP 003465619 B2 * 11/2003
JP 2010179685 A 8/2010

* cited by examiner

Primary Examiner — Kimberly T Wood
(74) Attorney, Agent, or Firm — Reising Ethington, P.C.

(57) ABSTRACT

A cable guide attachment structure that enables a cable guide to be attached in a right-side up manner on both the left and right sides of a vehicle. The attachment structure includes a cable guide into which a wire harness is inserted, a fixing bracket for holding an end portion of the cable guide and being fixed to a body, and wrong assembly prevention portions that include a projecting portion provided on the end portion of the cable guide and a receding portion provided in the fixing bracket. The wrong assembly prevention portions are provided at reversed positions between the cases where the fixing bracket is fixed on the left and right sides of the body. The projecting portion fits into the receding portion if the cable guide is right-side up, and the projecting portion does not fit into the receding portion if the cable guide is upside down.

15 Claims, 14 Drawing Sheets

CABLE GUIDE ATTACHMENT STRUCTURE

This Application claims the benefit of Japanese Application No. JP2015-149382, filed on Jul. 29, 2015, the contents of which are hereby incorporated by reference in their entirety.

FIELD

The present invention relates to a cable guide attachment structure.

BACKGROUND

A wire harness that spans a sliding door and the body of an automobile is conventionally known. This wire harness is provided in order to supply electricity to electrical components installed in the sliding door.

Generally, this type of wire harness is inserted into a cable guide that can bend into a predetermined shape, and is then attached to the vehicle (e.g., see JP 2010-179685A). One end of the cable guide is fixed to the body side, the other end is fixed to the sliding door side, and the cable guide bends into a predetermined shape when the sliding door opens and closes. The bending direction and bending amount of the cable guide are appropriately set in conformity with the path of the sliding door in order to prevent the cable guide from moving eccentrically. If sliding doors that have bilaterally symmetrical opening/closing paths are provided on the left and right sides of the vehicle, there are cases where the cable guide is attached in a vertically reversed manner on the left and right sides of the vehicle.

JP 2010-179685A is an example of related art.

If the cable guide is attached in a vertically reversed manner on the left and right sides of the vehicle as described above, it is important to attach the cable guide without a mistake in terms of the vertical orientation, such that the opening/closing path of the sliding door and the bending deformation of the cable guide are consistent with each other.

The present design was achieved in light of the above-described circumstances, and an object thereof is to provide a cable guide attachment structure that enables a cable guide to be attached in a right-side up manner on both the left and right sides of a vehicle.

SUMMARY

A cable guide attachment structure according to one aspect includes: a cable guide into which a wire harness for spanning a sliding door and a body is to be inserted; a fixing bracket that holds an end portion of the cable guide and is to be fixed to the body or the sliding door; and wrong assembly prevention portions including a projecting portion provided on one of the end portion of the cable guide and the fixing bracket, and a receding portion provided on another one of the end portion of the cable guide and the fixing bracket, wherein the wrong assembly prevention portions are provided at reversed positions between a case where the fixing bracket is fixed on a left side of the body and a case where the fixing bracket is fixed on a right side of the body, and the projecting portion fits into the receding portion in a case where the cable guide is right-side up relative to the fixing bracket, and the projecting portion does not fit into the receding portion in a case where the cable guide is upside down.

According to this aspect, due to the projecting portion not fitting into the receding portion, it is possible to realize that the orientation of the cable guide relative to the fixing bracket on the left side or the right side is wrong, thus making it possible to attach the cable guide in a right-side up manner on both the left and right sides of a vehicle.

DRAWINGS

Figure 7:
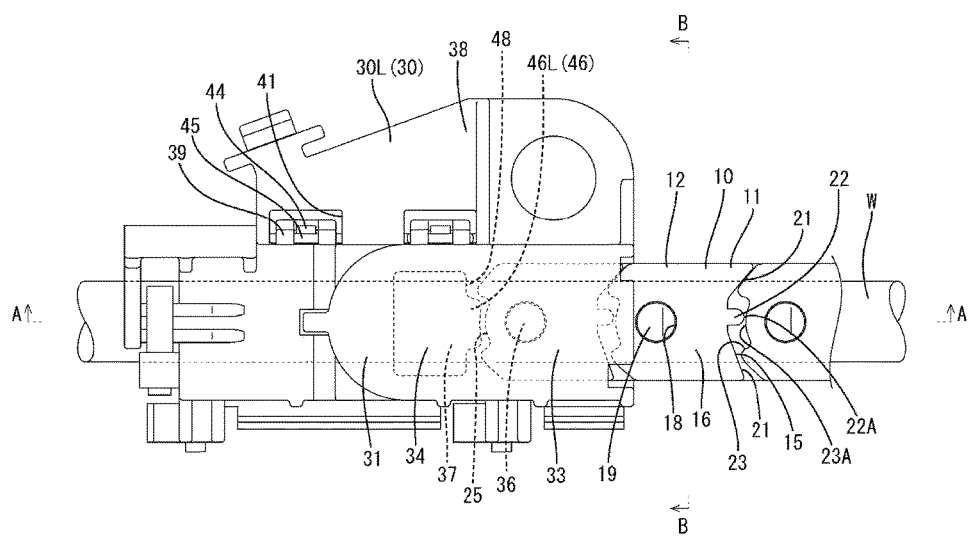
FIG. 7 is a plan view of the left-side fixing bracket in a state in which the end portion of the cable guide is held in the correct orientation.
Figure 8A:
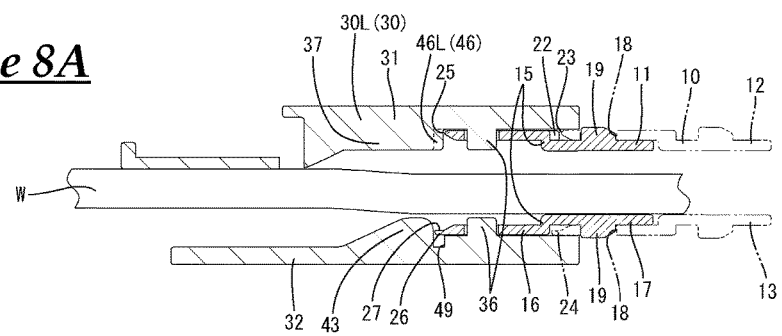
Figure 8B:
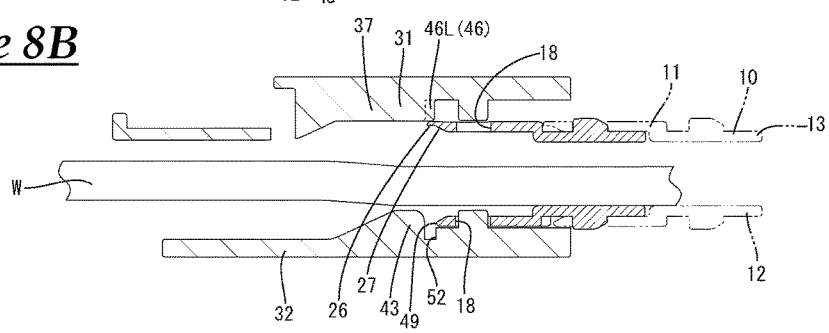
Figure 9A:
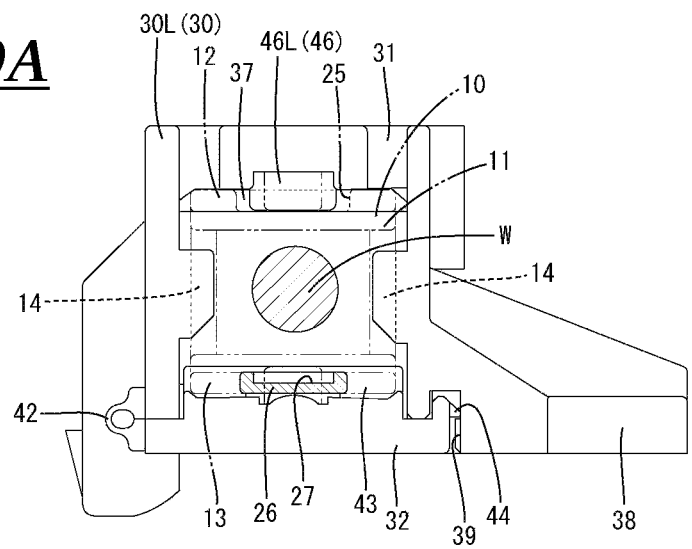
Figure 9B:
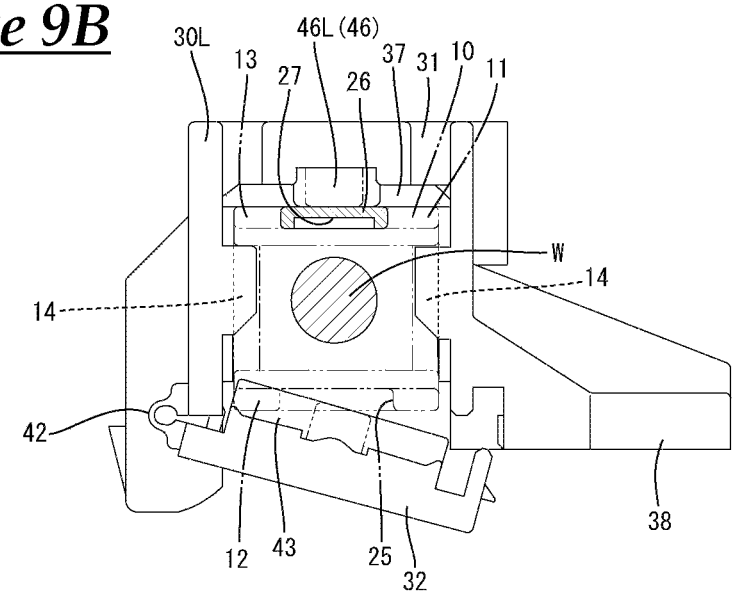
Figure 10:
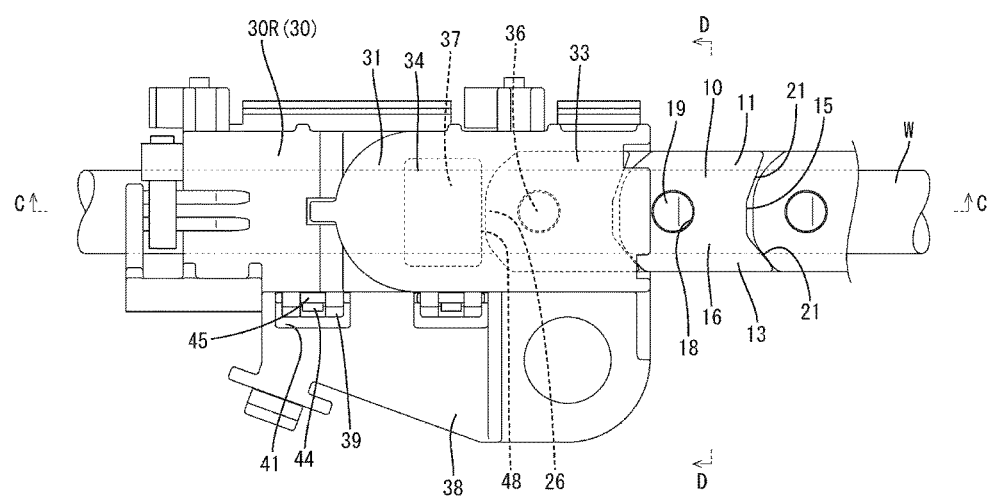
Figure 11A:
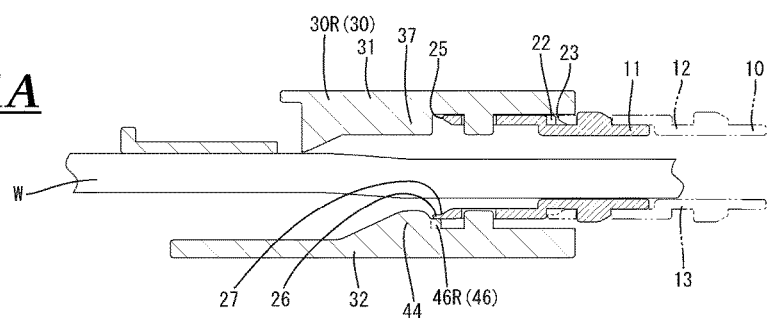
Figure 11B:
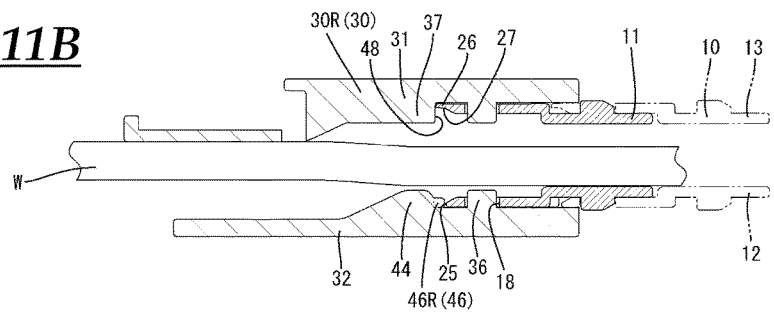
Figure 12A:
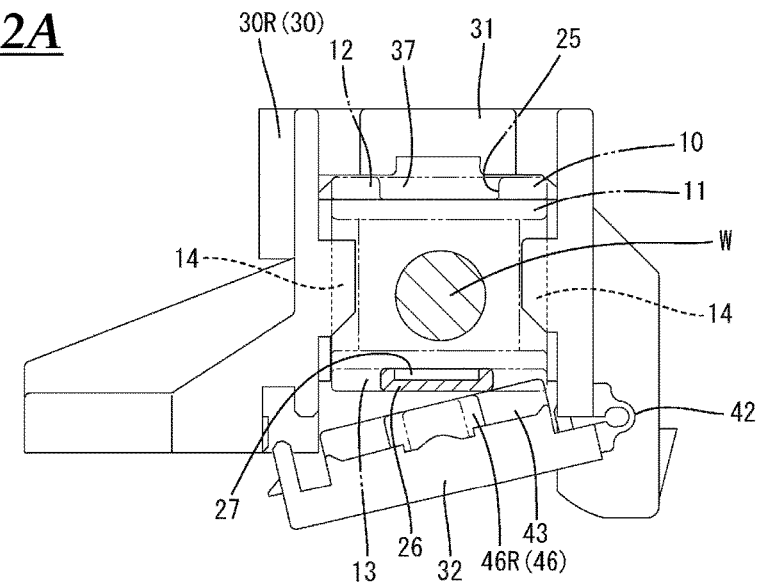
Figure 12B:
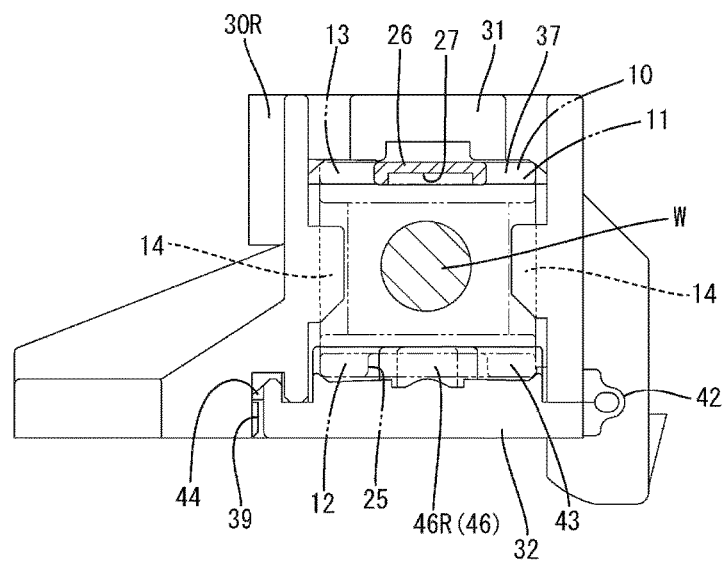
Figure 13A:
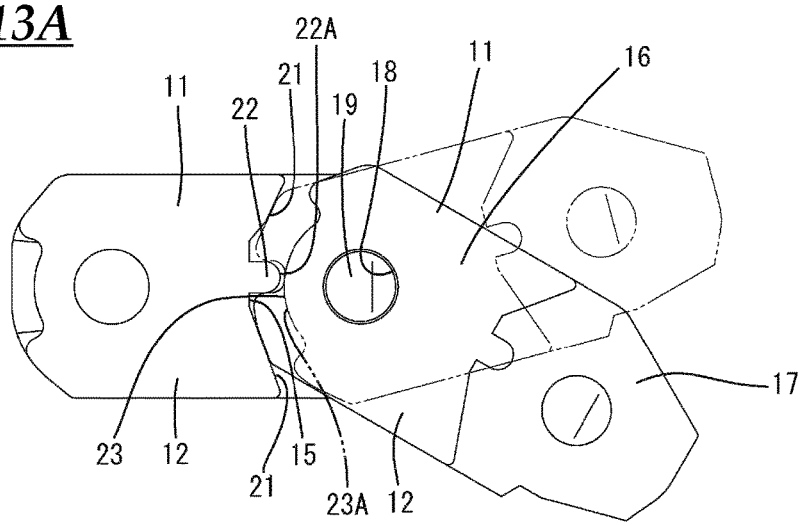
Figure 13B:
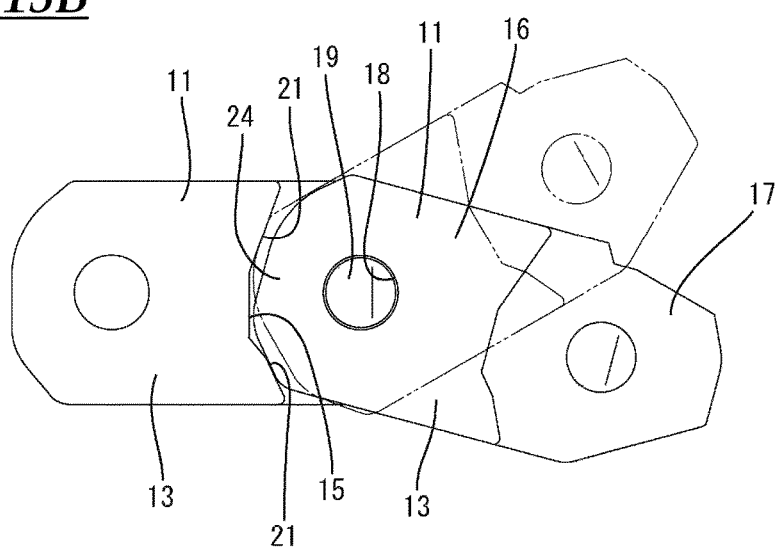
Figure 14A:
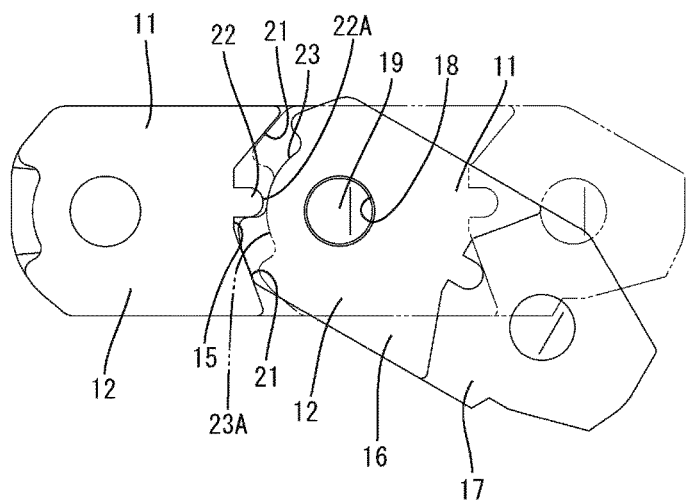
Figure 14B:
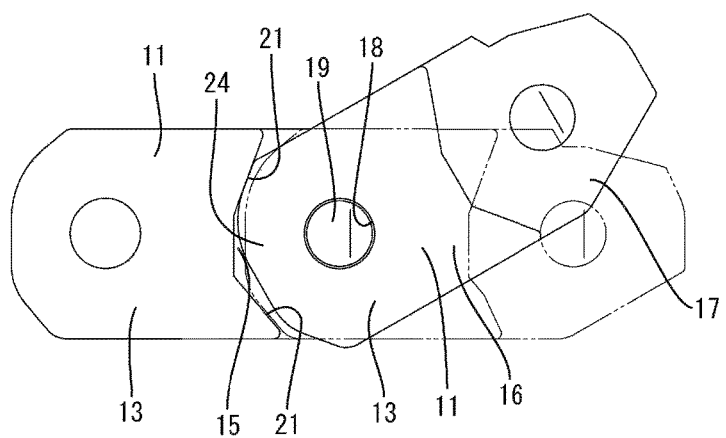

FIG. 8A is a cross-sectional view of the left-side fixing bracket in a state in which the end portion of the cable guide is held in the correct orientation, and FIG. 8B is a cross-sectional view of the left-side fixing bracket in a state in which the end portion of the cable guide is set thereon in the wrong orientation, both of these cross-sectional views corresponding to cross-sections taken at the position indicated by A-A in FIG. 7;

FIG. 9A is a cross-sectional view of the left-side fixing bracket in a state in which the end portion of the cable guide is held in the correct orientation, and FIG. 9B is a cross-sectional view of the left-side fixing bracket in a state in which the end portion of the cable guide is set thereon in the wrong orientation, both of these cross-sectional views corresponding to cross-sections taken at the position indicated by B-B in FIG. 7;

FIG. 10 is a plan view of the right-side fixing bracket in a state in which the end portion of the cable guide is held in the correct orientation;

FIG. 11A is a cross-sectional view of the right-side fixing bracket in a state in which the end portion of the cable guide is set thereon in the wrong orientation, and FIG. 11B is a cross-sectional view of the right-side fixing bracket in a state in which the end portion of the cable guide is held in the correct orientation, both of these cross-sectional views corresponding to cross-sections taken at the position indicated by C-C in FIG. 10;

FIG. 12A is a cross-sectional view of the right-side fixing bracket in a state in which the end portion of the cable guide is set thereon in the wrong orientation, and FIG. 12B is a cross-sectional view of the right-side fixing bracket in a state in which the end portion of the cable guide is held in the correct orientation, both of these cross-sectional views corresponding to cross-sections taken at the position indicated by D-D in FIG. 10;

FIG. 13A is a plan view showing how a link member pivots to the left and right sides, and FIG. 13B is a bottom view showing how the link member pivots to the left and right sides; and FIG. 14A is a plan view showing how a link member pivots to only one side in the left-right direction, and FIG.

14B is a bottom view showing how the link member pivots to only one side in the left-right direction.

DESCRIPTION

Preferred embodiments of the present design will be described below.

The cable guide attachment structure according to the one aspect may have a configuration in which the fixing bracket has a body portion and a lid portion, and, by setting the end portion of the cable guide on the body portion and closing the lid portion, the end portion of the cable guide is held in the fixing bracket, and in a state where the projecting portion does not fit into the receding portion, the lid portion cannot be closed.

According to this configuration, if the cable guide is upside down, the end portion of the cable guide cannot be held in the fixing bracket, thus making it possible to reliably prevent the cable guide from being attached in the wrong orientation.

Also, the cable guide attachment structure according to the one aspect may have a configuration in which the cable guide is constituted by coupling together a plurality of link members into which the wire harness can be inserted, and upper surface portions or lower surface portions of adjacent link members are provided with a fitting protrusion portion and a fitting recession portion that fit together in a case where a vertical orientation of the adjacent link members is correct, and, in a case where the vertical orientation of the adjacent link members is wrong, the fitting protrusion portion abuts against the upper surface portion or the lower surface portion, and coupling is not possible. According to this configuration, it is possible to prevent link members from being coupled in an upside down manner.

Also, the cable guide attachment structure according to the one aspect may have a configuration in which when the adjacent link members pivot relative to each other, the fitting protrusion portion relatively moves in the fitting recession portion, and when a pivot amount of the link members reaches a predetermined amount, the fitting protrusion portion becomes located at an end portion of the fitting recession portion. According to this configuration, the pivot amount of the link members can be restricted by the fitting protrusion portion and the fitting recession portion.

Hereinafter, a specific embodiment will be described in detail with reference to FIGS. 1 to 14B.

An attachment structure for a cable guide 10 of the present embodiment includes: a cable guide 10 into which a wire harness W is inserted, the wire harness W being for spanning a sliding door 1 and a body 2 of a vehicle; a door-side fixing bracket 3 for fixing an end portion of the cable guide 10 to the sliding door 1; and a body-side fixing bracket 30 for fixing an end portion of the cable guide 10 to the body 2. The wire harness W is a bundle of electrical wires for supplying electricity to various electrical components (not shown) that are installed in the sliding door 1. The wire harness W is inserted into the cable guide 10 with a clearance retained in the periphery.

Figure 1:
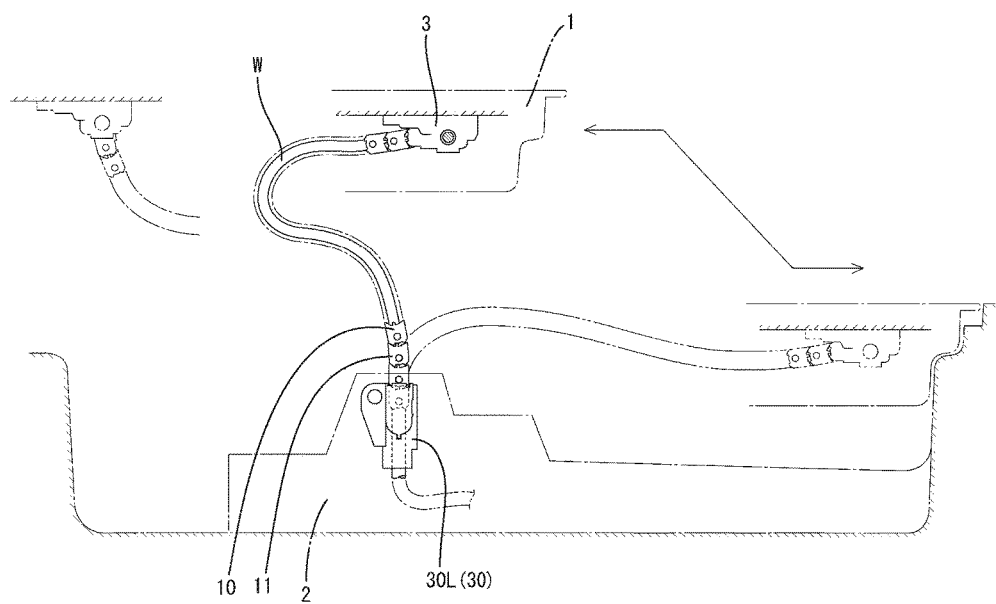
FIG. 1 is a plan view of a cable guide attachment structure according to an embodiment, and illustratively shows deformation of a cable guide on the left side of a vehicle.
Figure 2:
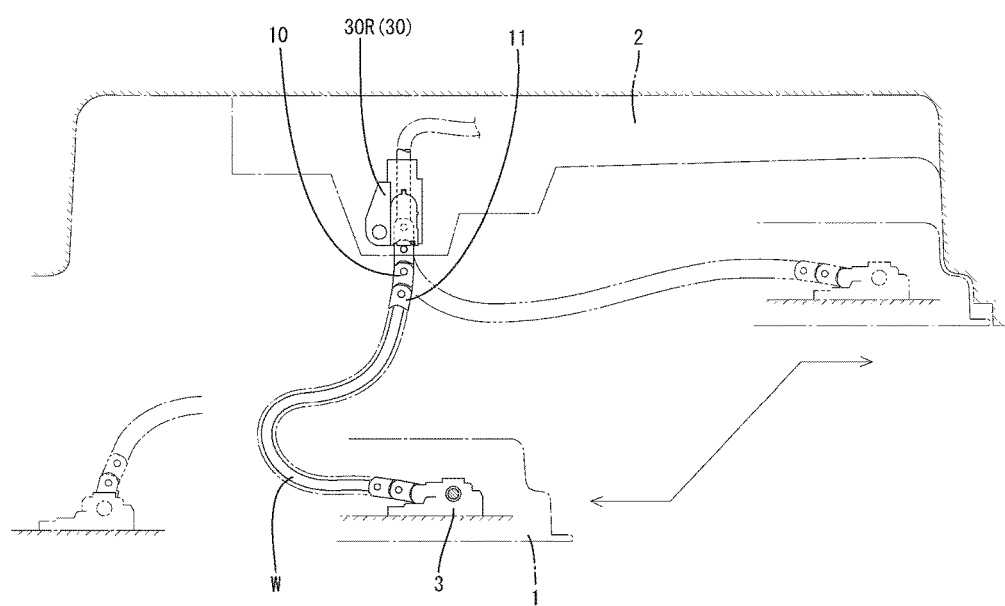
FIG. 2 is a plan view of the cable guide attachment structure, and illustratively shows deformation of the cable guide on the right side of the vehicle.

The sliding door 1 is provided on the left and right sides of the vehicle, and opens and closes a doorway by sliding in the front-rear direction. Note that as shown in FIGS. 1 and 2, when the sliding door 1 is at an open position for opening the doorway, the door-side fixing bracket 3 is located rearward of the body-side fixing bracket 30, and when the sliding door 1 is at a closed position for closing the doorway, the door-side fixing bracket 3 is located forward of the body-side fixing bracket 30. The cable guide 10 undergoes predetermined curving deformation in accordance with opening and closing of the sliding door 1.

The cable guide 10 is constituted by coupling together multiple link members 11 into which the wire harness W can be inserted.

The link members 11 are made of a synthetic resin, and are roughly shaped as boxes that are elongated in the coupling direction of the link members 11. As shown in FIGS. 9A and 9B for example, each link member 11 includes an upper surface portion and a lower surface portion (hereinafter, called a first horizontal plate portion 12 and a second horizontal plate portion 13) that oppose each other in the vertical direction when attached to the vehicle, and a pair of left and right vertical plate portions 14 that connect the first horizontal plate portion 12 and the second horizontal plate portion 13 to each other. The first horizontal plate portion 12 and the second horizontal plate portion 13 are approximately parallel to each other.

As shown in FIGS. 8A and 8B for example, step portions 15 are provided in the lengthwise central portion of the link member 11. The step portion 15 is a vertical step that is provided on both the first horizontal plate portion 12 and the second horizontal plate portion 13. Due to the step portions 15, the height dimension of the portion of the link member 11 on one end side of the step portion 15 in the lengthwise direction (hereinafter, this portion is called the first coupling portion 16), that is to say the interval between the first horizontal plate portion 12 and the second horizontal plate portion 13, is greater than the height dimension of the portion on the other end side (hereinafter, this portion is called the second coupling portion 17).

Coupling holes 18 for coupling the link member 11 are provided in the first coupling portion 16, and coupling shafts 19 for coupling the link member 11 are provided on the second coupling portion 17.

The coupling holes 18 have an approximately circular shape, and pass through the first horizontal plate portion 12 and the second horizontal plate portion 13 in the vertical direction in a coaxial manner.

The coupling shafts 19 have an approximately circular cross-section that conforms to the coupling holes 18, and are provided so as to respectively project in a coaxial manner from the outer surface of the first horizontal plate portion 12 and the outer surface of the second horizontal plate portion 13 (the surfaces on the opposite sides of the opposing surfaces of the first horizontal plate portion 12 and the second horizontal plate portion 13). The projecting dimension of the coupling shafts 19 is equivalent to the height dimension of the step portions 15.

The link members 11 are coupled to each other by placing the first coupling portion 16 of one link member 11 on the outer side of the second coupling portion 17 of another link member 11. The coupling holes 18 of the first coupling portion 16 are then fitted around the coupling shafts 19 of the second coupling portion 17, thus enabling the link members 11 to pivot relative to each other. Note that in the cable guide 10, the link members 11 are coupled in an orientation according to which the first coupling portions 16 are arranged on the body 2 side, and the second coupling portions 17 are arranged on the sliding door 1 side.

As shown in FIGS. 13A to 14B, the two end portions, in the width direction (left-right direction), of the step portion 15 of the link member 11 are pivot restriction portions 21 that restrict the pivot amount of a coupled link member 11 to a predetermined amount. The pivot restriction portions 21 are inclined so as to gradually protrude toward the second coupling portion 17 as they extend from the widthwise central side toward the respective ends. The pivoting of a coupled link member 11 is restricted by the tip portion of the first coupling portion 16 of the coupled link member 11 coming into contact with the pivot restriction portions 21. The pivot direction and pivot amount of the link member 11 are appropriately set using the shape of the pivot restriction portions 21. For example, by giving different shapes to the left and right pivot restriction portions 21, different pivot amounts can be set for the link member 11 on the left and right sides (see FIGS. 13A and 13B), or the pivot direction of the link member 11 can be restricted to only one side in the left-right direction (see FIGS. 14A and 14B). The pivot restriction portions 21 are provided on both the first horizontal plate portion 12 and the second horizontal plate portion 13 of each link member 11, with approximately the same shape.

Also, the first horizontal plate portions 12 (the upper surface portions or the lower surface portions) of adjacent link members 11 in the cable guide 10 are provided with a fitting protrusion portion 22 and a fitting recession portion 23 that fit with each other if the vertical orientation of adjacent link members 11 is correct.

The fitting protrusion portion 22 is provided on the step portion 15 of the first horizontal plate portion 12. The fitting protrusion portion 22 is provided in the widthwise central portion of the step portion 15 of the first horizontal plate portion 12 (between the left and right pivot restriction portions 21), and protrudes to the second coupling portion 17 side. A protruding end surface 22A of the fitting protrusion portion 22 is a curved surface having a circular arc shape.

On the other hand, the widthwise central portion of the step portion 15 of the second horizontal plate portion 13 recedes the most toward the first coupling portion 16 side in the step portion 15 overall, and forms an approximately right angle with the lengthwise direction of the link member 11.

Also, the fitting recession portion 23 is provided at the tip portion of the first horizontal plate portion 12 (the tip portion of the first coupling portion 16). The fitting recession portion 23 is formed as a recession in the widthwise central portion of the tip portion of the first coupling portion 16, and has a larger width in the left-right direction than the fitting protrusion portion 22. The fitting recession portion 23 has a curved surface 23A that is curved so as to be approximately parallel with the hole edge of the coupling hole 18, and a constant width is ensured between the fitting recession portion 23 and the coupling hole 18.

On the other hand, the tip portion of the second horizontal plate portion 13 (the tip portion of the first coupling portion 16) has an external shape in which the fitting recession portion 23 of the first horizontal plate portion 12 is filled in, and forms a portion (hereinafter, called a contact portion 24) that the fitting protrusion portion 22 comes into contact with if an attempt is made to couple a link member 11 that is upside down (in the wrong orientation). The tip surface of the contact portion 24 is approximately orthogonal to the lengthwise direction of the link member 11.

In the case where link members 11 are coupled in the correct orientation in which the first horizontal plate portions 12 are connected together and the second horizontal plate portions 13 are connected together, the fitting protrusion portion 22 of one of the link members 11 fits into the fitting recession portion 23 of the other link member 11, and the fitting protrusion portion 22 relatively moves in the fitting recession portion 23 when the adjacent link members 11 relatively pivot (see FIGS. 13A to 14B). The fitting protrusion portion 22 relatively moves to the left or right along the curved surface 23A of the fitting recession portion 23, and then becomes located at a widthwise end portion of the fitting recession portion 23 when the pivot amount of the link member 11 reaches a predetermined amount. Accordingly, the fitting protrusion portion 22 and the fitting recession portion 23 function so as to restrict the pivot amount of the link members 11 along with the pivot restriction portions 21.

The door-side fixing bracket 3 and the body-side fixing bracket 30 are respectively fixed to the sliding door 1 and the body 2 while holding the end portions of the cable guide 10.

Figure 3:
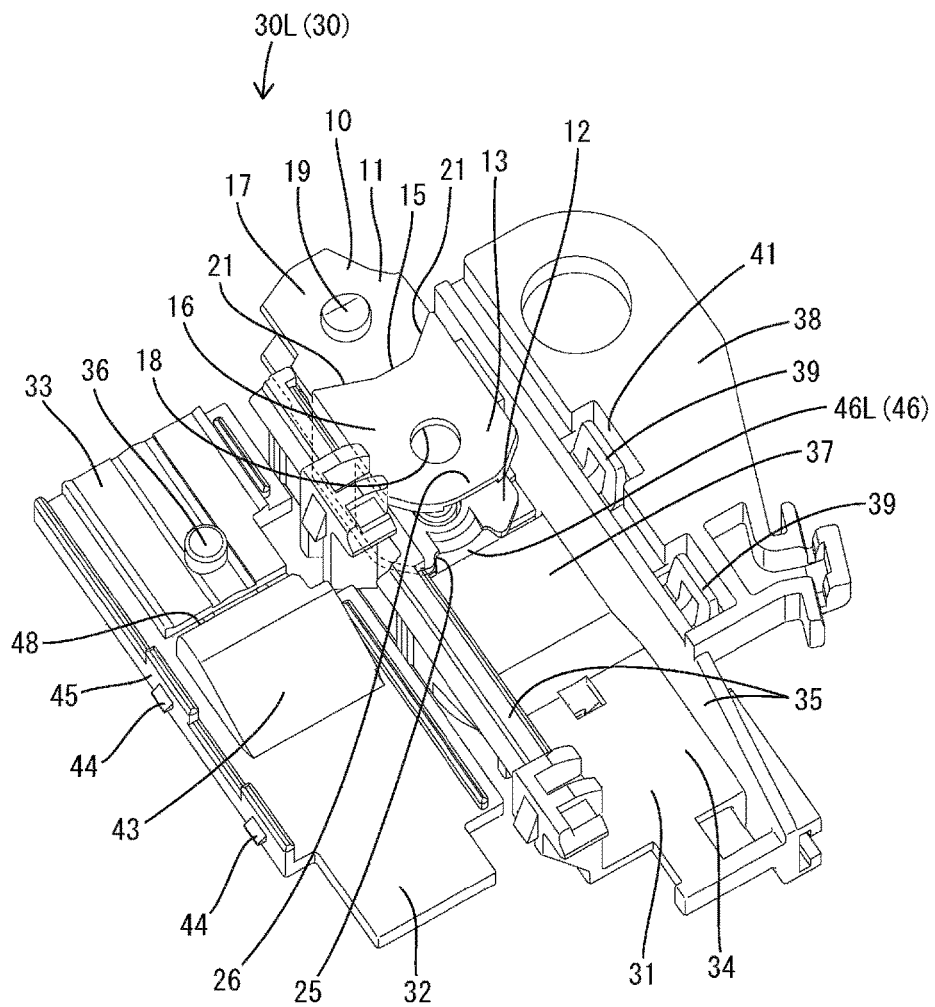
FIG. 3 is a perspective view of a left-side fixing bracket in a state in which an end portion of the cable guide has been set thereon.
Figure 4:
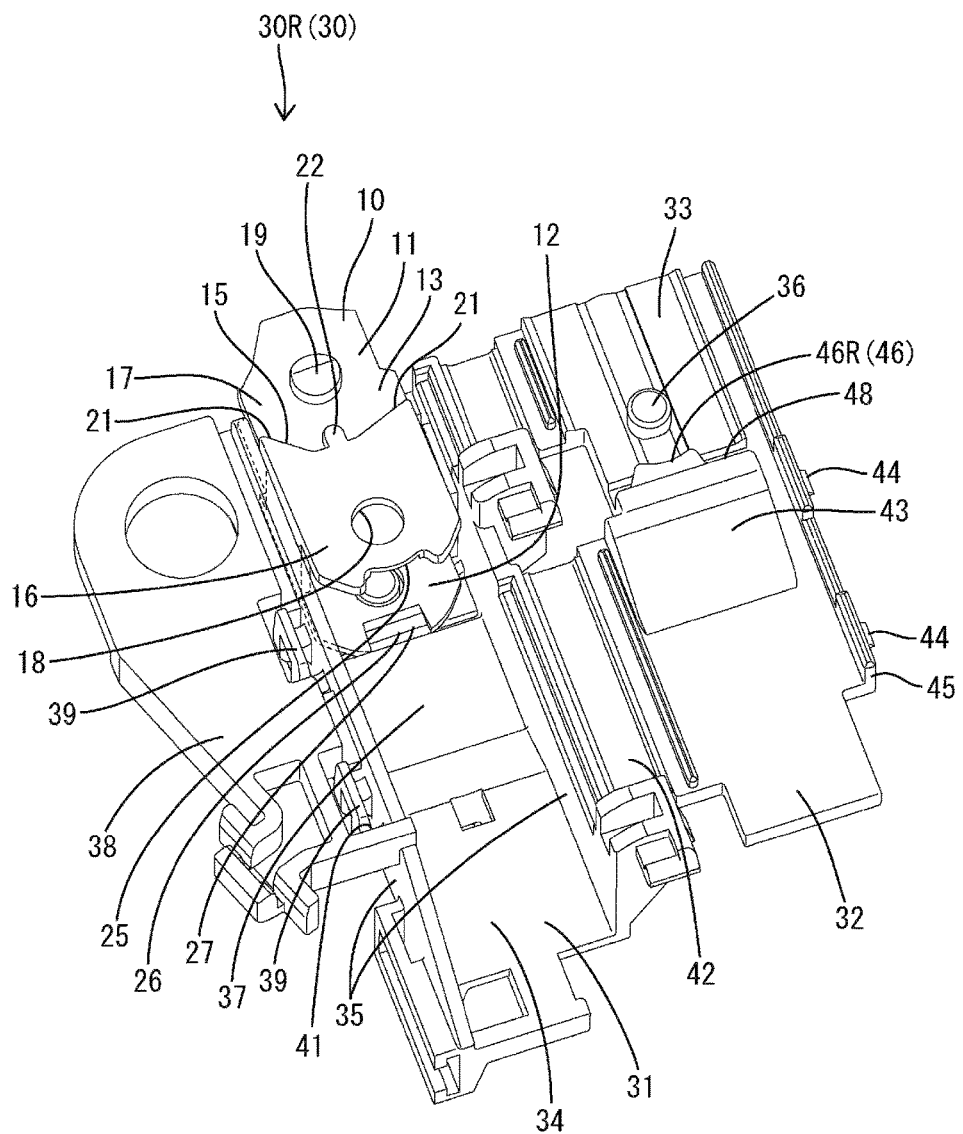
FIG. 4 is a perspective view of a right-side fixing bracket in a state in which an end portion of the cable guide has been set thereon.

As shown in FIGS. 3 and 4, the body-side fixing bracket 30 includes a body portion 31, which is overall shaped as a box that is elongated in one direction and is open on one surface side, and a lid portion 32 that can close the open portion of the body portion 31. By setting the end portion of the cable guide 10 on the body portion 31 and then closing the lid portion 32, the end portion of the cable guide 10 is held in the body-side fixing bracket 30.

A holding portion 33 for holding the end portion of the cable guide 10 is provided on one end portion of the body-side fixing bracket 30 in the lengthwise direction. In the holding portion 33, column portions 36 that fit into the coupling holes 18 of the end portion of the cable guide 10 are provided upright on the body portion 31 and the lid portion 32. The column portions 36 provided on the body portion 31 and the lid portion 32 are shaped as circular columns that conform to the coupling holes 18, and are provided so as to be coaxial in the vertical direction.

The body portion 31 includes a bottom wall portion 34 that is overall shaped as a rectangle that is elongated in one direction, and a pair of side wall portions 35 that are provided upright and extend along the left and right side edges of the bottom wall portion 34. The column portion 36 is provided upright on the bottom wall portion 34.

Figure 5:
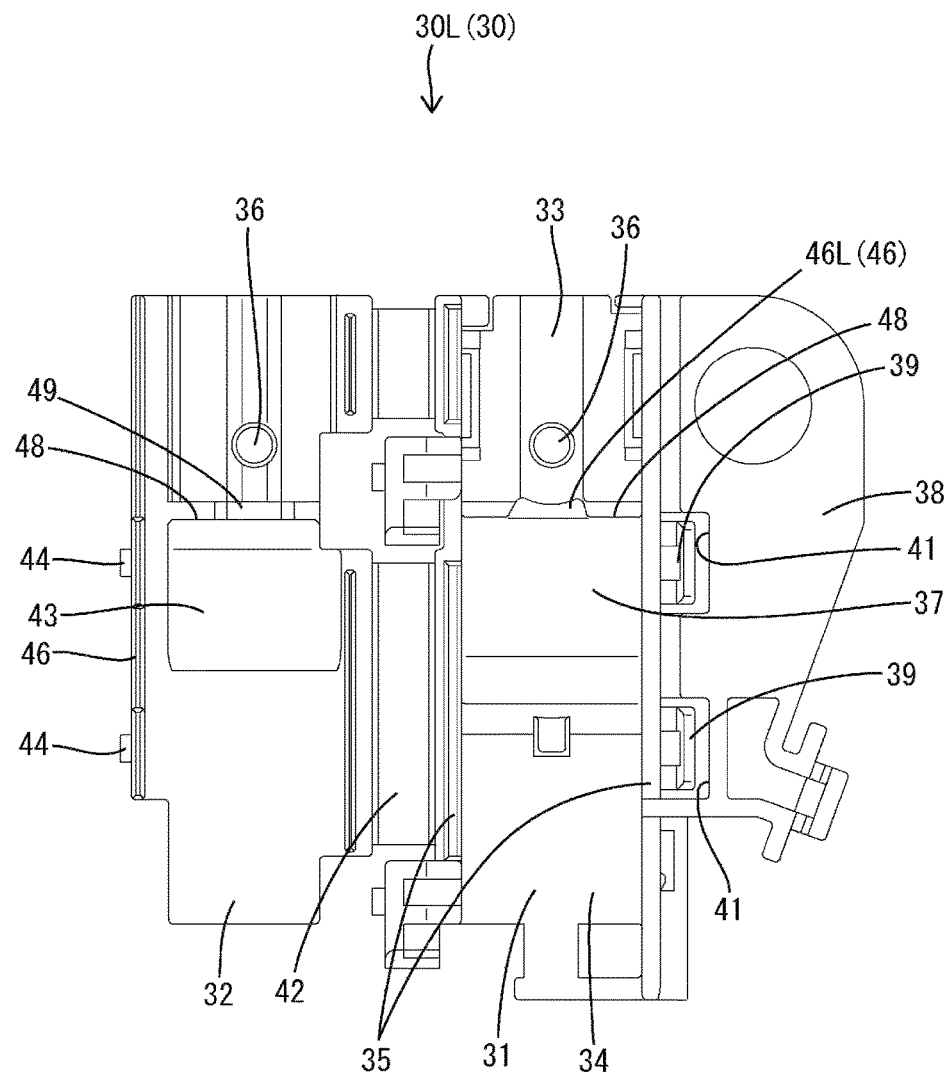
FIG. 5 is a plan view of the left-side fixing bracket.
Figure 6:
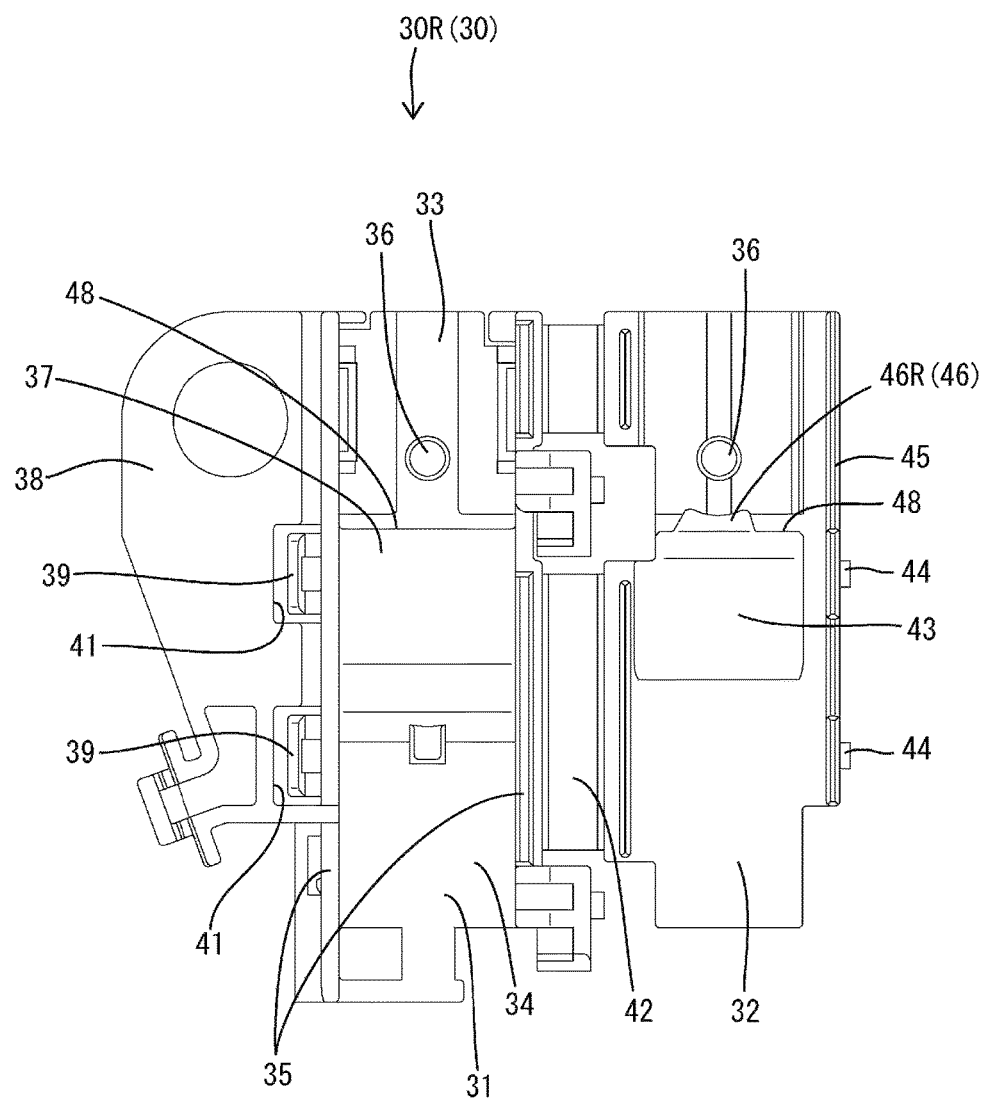
FIG. 6 is a plan view of the right-side fixing bracket.

Also, a bulging portion (hereinafter, called a body-side bulging portion 37) that bulges toward the lid portion 32 side one level higher than the holding portion 33 is provided in approximately the lengthwise central portion of the bottom wall portion 34. As shown in FIGS. 5 and 6, the body-side bulging portion 37 has a square shape over the left-right direction of the bottom wall portion 34.

A fixing portion 38 that is to be fixed to the body 2 side is provided so as to be integrated with one of the two side wall portions 35. The fixing portion 38 is shaped so as to protrude from the rising end portion of the side wall portion 35 in a direction approximately perpendicular to the side wall portion 35.

Also, lock portions (hereinafter, called body-side lock portions 39) for holding the lid portion 32 in a closed state are provided on the side wall portion 35 on the side on which the fixing portion 38 is provided. The body-side lock portions 39 are provided at multiple locations (two locations in the present embodiment) on the side wall portion 35. The body-side lock portions 39 are formed on lock clearance portions 41 formed on the fixing portions 38.

The lid portion 32 is provided so as to be integrated with, via a hinge portion 42, the other one of the two side wall portions 35. In the closed state for closing the open side of the body portion 31, the lid portion 32 is arranged so as to oppose the body portion 31 in the vertical direction while being approximately parallel to the bottom wall portion 34. The lid portion 32 is roughly shaped as a plate that is approximately rectangular and elongated in the same direction as the bottom wall portion 34 of the body portion 31.

A bulging portion (hereinafter, called a lid-side bulging portion 43) that bulges toward the body portion 31 side one level higher than the holding portion 33 is provided in approximately the lengthwise central portion of the lid portion 32. As shown in FIGS. 5 and 6, the lid-side bulging portion 43 has a square shape over the left-right direction of the lid portion 32.

Lock portions (hereinafter, called lid-side lock portions 44) for holding the lid portion 32 in the closed state are provided on the lid portion 32. The lid-side lock portions 44 are provided at two locations in correspondence with the body-side lock portions 39. The lid-side lock portions 44 protrude from the outer surface of a side portion 45 formed along one side edge of the lid portion 32.

Also, wrong assembly prevention portions for preventing the cable guide 10 from being assembled in the wrong vertical orientation are provided on the end portion of the cable guide 10 and the body-side fixing bracket 30. The wrong assembly prevention portions include a projecting portion 46 provided on the body-side fixing bracket 30 and a receding portion 25 provided in the end portion of the cable guide 10.

The projecting portion 46 is provided at reversed positions on the left-side fixing bracket 30L that is to be fixed to the left side of the body 2 and the right-side fixing bracket 30R that is to be fixed to the right side of the body 2 (see FIGS. 5 and 6). The projecting portion 46 of the left-side fixing bracket 30L (hereinafter, called a left-side projecting portion 46L) is provided on the body portion 31, and the projecting portion 46 of the right-side fixing bracket 30R (hereinafter, called a right-side projecting portion 46R) is provided on the lid portion 32. The left-side projecting portion 46L and the right-side projecting portion 46R protrude from the surface (hereinafter, called the partition surface 48) that faces the holding portion 33 on the body-side bulging portion 37 or the lid-side bulging portion 43. The left-side projecting portion 46L and the right-side projecting portion 46R have roughly the same shape, and, as shown in FIGS. 5 and 6, protrude from the widthwise central portion of the partition surface 48 toward the holding portion 33 side with an approximately trapezoidal shape. The protruding end surfaces (surfaces that oppose the column portions 36) of the two projecting portions 46L and 46R recede with a curved shape that is approximately parallel to the outer circumferential surfaces of the column portions 36.

On the other hand, as shown in FIG. 7 for example, the receding portion 25 is provided in the first horizontal plate portion 12 of the link member 11 that is arranged at the end portion of the cable guide 10. The receding portion 25 is formed as a partial cutout in the tip portion of the first coupling portion 16. The receding portion 25 is formed as a recession in the widthwise central portion of the tip portion of the first coupling portion 16, and has a shape that conforms to the projecting portion 46. The receding portion 25 has a curved shape so as to be approximately parallel with the hole edge of the coupling hole 18, and a constant width is ensured between the receding portion 25 and the coupling hole 18. Note that the receding portion 25 has approximately the same shape as the fitting recession portion 23.

Also, the tip portion of the second horizontal plate portion 13 of the link member 11 arranged at the end portion of the cable guide 10 has an external shape in which the receding portion 25 of the first horizontal plate portion 12 is filled in, and forms a portion that the projecting portion 46 comes into contact with (hereinafter, called an abutting portion 26) if an attempt is made to assemble the cable guide 10 to the body-side fixing bracket 30 in an upside down manner (in the wrong orientation). As shown in FIG. 10 for example, the tip surface of the abutting portion 26 is approximately orthogonal to the lengthwise direction of the link member 11.

Also, a receding portion 27 that recedes in the shape of a rectangle that is elongated in the left-right direction is formed in the inner surface of the abutting portion 26 (the opposing surface that opposes the first horizontal plate portion 12), as shown in FIG. 4 for example. The dimension of the receding portion 27 in the left-right right direction is equivalent to the dimension of the receding portion 25 in the left-right direction. The receding dimension of the receding portion 27 is the largest at the tip side of the cable guide 10, as shown in FIGS. 8A and 8B for example. Also, the portion of the receding portion 27 on the coupling hole 18 side is inclined such that the receding dimension gradually decreases.

As shown in FIGS. 5 and 6, in the left-side fixing bracket 30L and the right-side fixing bracket 30R, the partition surface 48 of the bulging portion not provided with the projecting portion 46 (specifically, the lid-side bulging portion 43 of the left-side fixing bracket 30L and the body-side bulging portion 37 of the right-side fixing bracket 30R) is a surface that is approximately orthogonal to the lengthwise direction of the body portion 31 or the lid portion 32, and rises at an approximately right angle to the bottom wall portion 34 or the lid portion 32, so as to conform to the end surface of the abutting portion 26 of the cable guide 10. Note that a groove recessed portion 49 having a rectangular shape is formed in the lid portion 32 of the left-side fixing bracket 30L so as to extend along the partition surface 48 of the lid-side bulging portion 43.

Also, as shown in FIGS. 8A and 11B, in the case where the cable guide 10 is right-side up relative to the left-side fixing bracket 30L and the right-side fixing bracket 30R, the projecting portion 46 fits into the receding portion 25, whereas as shown in FIGS. 8B and 11A, in the case where the cable guide 10 is upside down, the projecting portion 46 does not fit into the receding portion 25, and instead abuts against the abutting portion 26.

Next, examples of a manufacturing method and an attachment method for the cable guide 10 of the present embodiment will be described.

First, the cable guide 10 is manufactured by repeatedly performing the operation of coupling link members 11 together. When coupling link members 11 together, if an attempt is made to couple link members 11 in the incorrect upside down orientation, the coupling will not be possible due to the fitting protrusion portion 22 coming into contact with the contact portion 24. Accordingly, the worker can reliably eliminate such a mistaken operation without paying special attention to the orientation of the link members 11. Accordingly, the link members 11 are coupled together in the correct vertical orientation, and the manufacturing of a long cable guide 10 is complete.

Next, the wire harness W is inserted into the cable guide 10, and then the cable guide 10 is covered with a protective tube or the like (not shown).

Next, the end portions of the cable guide 10 are respectively attached to the door-side fixing bracket 3 and the body-side fixing bracket 30. In the present embodiment, the correct orientation is an orientation in which on the left side of the vehicle, the first horizontal plate portion 12 is arranged on the upper side and the second horizontal plate portion 13 is arranged on the lower side, and on the right side of the vehicle, the second horizontal plate portion 13 is arranged on the upper side, and the first horizontal plate portion 12 is arranged on the lower side.

First, the lid portion 32 of the left-side fixing bracket 30L is opened, and one end portion of the cable guide 10 is set on the body portion 31. At this time, as shown in FIGS. 8B and 9B, if an attempt is made to set the end portion of the cable guide 10 on the body portion 31 in the wrong vertical orientation (an orientation in which the second horizontal plate portion 13 is arranged on the body portion 31 side), the abutting portion 26 of the cable guide 10 abuts against the projecting portion 46 of the body portion 31, and the end portion of the cable guide 10 lies above the body portion 31. For this reason, even if an attempt is made to close the lid portion 32, the lid portion 32 comes into contact with the end portion of the cable guide 10 and cannot be closed. Accordingly, the worker can realize that the orientation of the cable guide 10 is wrong.

As shown in FIGS. 8A and 9A, if the end portion of the cable guide 10 is set on the body portion 31 in the correct orientation, the column portion 36 of the body portion 31 fits into the coupling hole 18 of the cable guide 10, and the projecting portion 46 of the body portion 31 fits into the receding portion 25 of the cable guide 10. Accordingly, the end portion of the cable guide 10 is appropriately set on the body portion 31 of the left-side fixing bracket 30L.

Next, the lid portion 32 is closed. Accordingly, the column portion 36 of the lid portion 32 fits into the coupling hole 18 of the cable guide 10, the partition surface 48 of the lid-side bulging portion 43 conforms to the end surface of the abutting portion 26 of the cable guide 10, the lid-side lock portions 44 become locked to the body-side lock portions 39, and the lid portion 32 is held in the closed state. In this way, the cable guide 10 is assembled to the left-side fixing bracket 30L in the correct vertical orientation.

Next, the lid portion 32 of the right-side fixing bracket 30R is opened, and one end portion of the cable guide 10 is set on the body portion 31. At this time, as shown in FIGS. 11A and 12A, if an attempt is made to set the cable guide 10 on the body portion 31 in the wrong vertical orientation (an orientation in which the first horizontal plate portion 12 is arranged on the body portion 31 side), the column portion 36 of the body portion 31 fits into the coupling hole 18 of the cable guide 10, and the end portion of the cable guide 10 is set on the body portion 31 without a gap. However, when an attempt is made to close the lid portion 32, the projecting portion 46 of the lid portion 32 abuts against the abutting portion 26 of the cable guide 10, and the lid portion 32 cannot be closed. Accordingly, the worker can realize that the orientation of the cable guide 10 is wrong.

As shown in FIGS. 11B and 12B, when the end portion of the cable guide 10 is set on the body portion 31 in the correct orientation, the column portion 36 of the body portion 31 fits into the coupling hole 18 of the cable guide 10, and the end surface of the abutting portion 26 of the cable guide 10 conforms to the partition surface 48 of the body-side bulging portion 37. Accordingly, the end portion of the cable guide 10 is appropriately set on the body portion 31 of the right-side fixing bracket 30R.

Next, the lid portion 32 is closed. Accordingly, the column portion 36 of the lid portion 32 fits into the coupling hole 18 of the cable guide 10, the projecting portion 46 of the lid portion 32 fits into the receding portion 25 of the cable guide 10, the lid-side lock portions 44 become locked to the body-side lock portions 39, and the lid portion 32 is held in the closed state. In this way, the cable guide 10 is assembled to the right-side fixing bracket 30R in the correct vertical orientation.

When the end portion of the cable guide 10 on the other end side is attached to the door-side fixing bracket 3, the cable guide 10 spans the vehicle body 2 and the sliding door 1 in the appropriate orientation. Accordingly, the attachment of the cable guide 10 is complete.

Next, actions and effects of the embodiment having the above-described configuration will be described.

The attachment structure for the cable guide 10 of the present embodiment includes: the cable guide 10 into which the wire harness W is inserted, the wire harness W being for spanning the sliding door 1 and the body 2; the body-side fixing bracket 30 for holding an end portion of the cable guide 10 and being fixed to the body 2; and the wrong assembly prevention portions that include the projecting portion 46 provided on the body-side fixing bracket 30 and the receding portion 25 provided in the end portion of the cable guide 10. Also, the projecting portion 46 is provided at reversed positions on the left-side fixing bracket 30L that is to be fixed to the left side of the body 2 and the right-side fixing bracket 30R that is to be fixed to the right side of the body 2, and, in the case where the cable guide 10 is right-side up relative to the left-side fixing bracket 30L and the right-side fixing bracket 30R, the projecting portion 46 fits into the receding portion 25, whereas in the case where the cable guide 10 is upside down, the projecting portion 46 abuts against the abutting portion 26 instead of fitting into the receding portion 25.

According to this configuration, due to the projecting portion 46 abutting against the abutting portion 26 instead of fitting into the receding portion 25, it is possible to realize that the cable guide 10 is in the wrong orientation relative to the left-side fixing bracket 30L and the right-side fixing bracket 30R, thus making it possible to attach the cable guide 10 in a right-side up manner on both the left and right sides of the vehicle.

Also, the body-side fixing bracket 30 has the body portion 31 and the lid portion 32, and, by setting an end portion of the cable guide 10 on the body portion 31 and closing the lid portion 32, the end portion of the cable guide 10 is held in the body-side fixing bracket 30, whereas if the projecting portion 46 abuts against the abutting portion 26 instead of fitting into the receding portion 25, the lid portion 32 cannot be closed.

According to this configuration, if the cable guide 10 is upside down, the end portion of the cable guide 10 cannot be held in the body-side fixing bracket 30, and therefore it is possible to reliably prevent the cable guide 10 from being assembled in an upside down manner.

Also, the cable guide 10 is constituted by coupling together multiple link members 11 into which the wire harness W can be inserted, the first horizontal plate portions 12 of adjacent link members 11 are provided with the fitting protrusion portion 22 and the fitting recession portion 23 that fit together if the vertical orientation of the adjacent link members 11 is correct, and, if the vertical orientation of the adjacent link members 11 is wrong, the fitting protrusion portion 22 abuts against the second horizontal plate portion 13, and coupling is not possible. According to this configuration, it is possible to prevent link members 11 from being coupled in an upside down manner.

Also, when adjacent link members 11 pivot relative to each other, the fitting protrusion portion 22 relatively moves inside the fitting recession portion 23, and, when the pivot amount of the link members 11 reaches a predetermined amount, the fitting protrusion portion 22 becomes located at an end portion of the fitting recession portion 23. According to this configuration, the pivot amount of the link members 11 can be restricted by the fitting protrusion portion 22 and the fitting recession portion 23.

The present invention is not limited to the embodiment described above using the foregoing description and drawings, and embodiments such as the following are also encompassed in the technical scope of the present invention.

In the above embodiment, the receding portion 25 is provided in an end portion of the cable guide 10, and the projecting portion 46 is provided on the body-side fixing bracket 30, but a configuration is possible in which, conversely, the projecting portion is provided on the end portion of the cable guide, and the receding portion is provided in the body-side fixing bracket.

In the above embodiment, the projecting portion 46 is provided on the body portion 31 of the left-side fixing bracket 30L and the lid portion 32 of the right-side fixing bracket 30R, but there is no limitation to this, and a configuration is possible in which, conversely, the projecting portion 46 is provided on the lid portion of the left-side fixing bracket and the body portion of the right-side fixing bracket. In this case, the bending direction of the cable guide may be the opposite of that in the above embodiment, and a configuration is possible in which the bending direction of the cable guide is the same as that in the above embodiment, and the receding portion is provided in the second horizontal plate portion instead.

Although the case where a wrong assembly prevention portion is provided on the body-side fixing bracket 30 is described in the above embodiment, there is no limitation to this, and the wrong assembly prevention portion may be provided on the door-side fixing bracket.

Although the receding portion 25 has the same shape as the fitting recession portion 23 in the above embodiment, these portions may have different shapes.

Although the fitting recession portion 23 and the fitting protrusion portion 22 are provided on the link member 11 in the above embodiment, these portions are not necessarily required to be provided.

Although the receding portion 25 is provided as a cutout in the tip portion of the link member 11 in the above embodiment, there is no limitation to this, and the receding portion may be a closed-perimeter hole formed in an intermediate portion of the link member, a recession formed in the outer surface side, or the like.

Although the projecting portion 46 is provided on the body portion 31 or the lid portion 32 of the body-side fixing bracket 30 in the above embodiment, there is no limitation to this, and, for example, the projecting portion may be provided on a side wall portion of the body-side fixing bracket, and in this case, the receding portion of the cable guide may be provided in a vertical plate portion.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A cable guide attachment structure, comprising:
a cable guide including an end portion;
a wire harness for spanning a sliding door and a body structure, the wire harness is to be inserted into the cable guide;
a fixing bracket including a body portion and a lid portion connected by a hinge portion and a lock portion, when the end portion of the cable guide is set on the body portion of the fixing bracket and the lid portion is closed and locked, the fixing bracket holds the end portion of the cable guide and is to be fixed to the body structure or the sliding door; and
wrong assembly prevention portions including a projecting portion and a receding portion;
wherein either:
the projecting portion is provided on the end portion of the cable guide and the receding portion is provided on the fixing bracket; or
the projecting portion is provided on the fixing bracket and the receding portion is provided on the end portion of the cable guide; and
the projecting portion fits into the receding portion when the cable guide is oriented suitably relative to the fixing bracket such that the vertical orientation of the cable guide is correct, and the projecting portion does not fit into the receding portion when the cable guide is not oriented suitably relative to the fixing bracket such that the vertical orientation of the cable guide is incorrect.

2. The cable guide attachment structure according to claim 1,
in a state where the projecting portion does not fit into the receding portion, the lid portion cannot be closed and locked to the body portion.

3. The cable guide attachment structure according to claim 1, wherein the wrong assembly prevention portions are configured to prevent the fixing bracket and the end portion of the cable guide from being coupled in a manner in which the end portion of the cable guide is not oriented suitably relative to the fixing bracket such that the vertical orientation of the cable guide is incorrect when the end portion of the cable guide is coupled to the fixing bracket.

4. The cable guide attachment structure according to claim 1, wherein
the cable guide includes a row of a plurality of link members, in which an adjacent two of the link members are pivotally connected about a pivotal axis extending in a vertical direction, and
the end portion of the cable guide is a distal end link member of the row of the plurality of link members.

5. The cable guide attachment structure according to claim 1,
wherein the cable guide is constituted by coupling together a plurality of link members into which the wire harness can be inserted; and
upper surface portions or lower surface portions of adjacent link members are provided with a fitting protrusion portion and a fitting recession portion that fit together when a vertical orientation of the adjacent link members is correct, and, when the vertical orientation of the adjacent link members is wrong, the fitting protrusion portion abuts against the upper surface portion or the lower surface portion, and coupling is not possible.

6. The cable guide attachment structure according to claim 5,
wherein when the adjacent link members pivot relative to each other, the fitting protrusion portion relatively moves in the fitting recession portion; and
when a pivot amount of the link members reaches a predetermined amount, the fitting protrusion portion becomes located at an end portion of the fitting recession portion.

7. The cable guide attachment structure according to claim 1, wherein
the cable guide is a pair of right-side and left-side cable guides, the right-side and left-side cable guides each including a first horizontal plate and a second horizontal plate, the first horizontal plate and the second horizontal plate opposing each other in a vertical direction with a vertical gap therebetween,
the fixing bracket is a pair of right-side and left-side fixing brackets, the right-side and left-side fixing brackets each including a top-wall of the lid portion and a bottom wall,
the wrong assembly prevention portions are configured such that:
the right-side cable guide is able to be coupled to the right-side fixing bracket while the right-side cable guide is not able to be coupled to the left-side fixing bracket, when one of the first horizontal plate and the second horizontal plate of the right-side cable guide is a top horizontal plate of the right-side cable guide, and the other of the first horizontal plate and the second horizontal plate of the right-side cable guide is a bottom horizontal plate of the right-side cable guide, and
the left-side cable guide is able to be coupled to the left-side fixing bracket while the left-side cable guide is not able to be coupled to the right-side fixing bracket, when one of the first horizontal plate and the second horizontal plate of the left-side cable guide is a bottom horizontal plate of the left-side cable guide, and the other of the first horizontal plate and the second horizontal plate of the left-side cable guide is a top horizontal plate of the left-side cable guide.

8. The cable guide attachment structure according to claim 7, wherein
the wrong assembly prevention portion of the left-side fixing bracket is formed on the bottom wall of the left-side fixing bracket and is not formed on the wall of the lid portion of the left-side fixing bracket, and
the wrong assembly prevention portion of the right-side fixing bracket is formed on the wall of the lid portion of the right-side fixing bracket and is not formed on the bottom wall of the right-side fixing bracket.

9. The cable guide attachment structure according to claim 7, wherein the left-side fixing bracket and the right-side fixing bracket have a mutually chiral shape with respect to one another, except for the wrong assembly prevention portions of the left-side fixing bracket and the right-side fixing bracket.

10. A cable guide attachment structure, comprising:
a cable guide including an end portion;
a wire harness for spanning a sliding door and a body structure, the wire harness is to be inserted into the cable guide;
a fixing bracket including a body portion and a lid portion, when the end portion of the cable guide is set on the body portion of the fixing bracket and the lid portion is closed and locked, the fixing bracket holds the end portion of the cable guide and is to be fixed to the body structure or the sliding door; and
wrong assembly prevention portions including a projecting portion and a receding portion;
wherein either:
the projecting portion is provided on the end portion of the cable guide and the receding portion is provided on the fixing bracket; or
the projecting portion is provided on the fixing bracket and the receding portion is provided on the end portion of the cable guide; and
the projecting portion fits into the receding portion when the cable guide is oriented suitably relative to the fixing bracket such that the vertical orientation of the cable guide is correct, and the projecting portion does not fit into the receding portion when the cable guide is not oriented suitably relative to the fixing bracket such that the vertical orientation of the cable guide is incorrect.

11. The cable guide attachment structure according to claim 10, wherein the wrong assembly prevention portions are configured to prevent the fixing bracket and the end portion of the cable guide from being coupled in a manner in which the end portion of the cable guide is not oriented suitably relative to the fixing bracket such that the vertical orientation of the cable guide is incorrect when the end portion of the cable guide is coupled to the fixing bracket.

12. The cable guide attachment structure according to claim 10, wherein
the cable guide includes a row of a plurality of link members, in which an adjacent two of the link members are pivotally connected about a pivotal axis extending in a vertical direction, and
the end portion of the cable guide is a distal end link member of the row of the plurality of link members.

13. The cable guide attachment structure according to claim 10, wherein
the cable guide is a pair of right-side and left-side cable guides, the right-side and left-side cable guides each including a first horizontal plate and a second horizontal plate, the first horizontal plate and the second horizontal plate opposing each other in a vertical direction with a vertical gap therebetween,
the fixing bracket is a pair of right-side and left-side fixing brackets, the right-side and left-side fixing brackets each including a wall of the lid portion and a bottom wall,
the wrong assembly prevention portions are configured such that:
the right-side cable guide is able to be coupled to the right-side fixing bracket while the right-side cable guide is not able to be coupled to the left-side fixing bracket, when one of the first horizontal plate and the second horizontal plate of the right-side cable guide is a top horizontal plate of the right-side cable guide, and the other of the first horizontal plate and the second horizontal plate of the right-side cable guide is a bottom horizontal plate of the right-side cable guide, and
the left-side cable guide is able to be coupled to the left-side fixing bracket while the left-side cable guide is not able to be coupled to the right-side fixing bracket, when one of the first horizontal plate and the second horizontal plate of the left-side cable guide is a bottom horizontal plate of the left-side cable guide, and the other of the first horizontal plate and the second horizontal plate of the left-side cable guide is a top horizontal plate of the left-side cable guide.

14. The cable guide attachment structure according to claim 13, wherein
the wrong assembly prevention portion of the left-side fixing bracket is formed on the bottom wall of the left-side fixing bracket and is not formed on the wall of the lid portion of the left-side fixing bracket, and
the wrong assembly prevention portion of the right-side fixing bracket is formed on the wall of the lid portion of the right-side fixing bracket and is not formed on the bottom wall of the right-side fixing bracket.

15. The cable guide attachment structure according to claim 13, wherein the left-side fixing bracket and the right-side fixing bracket have a mutually chiral shape with respect to one another, except for the wrong assembly prevention portions of the left-side fixing bracket and the right-side fixing bracket.

* * * * *